US009122587B2

(12) United States Patent
Baryudin et al.

(10) Patent No.: US 9,122,587 B2
(45) Date of Patent: Sep. 1, 2015

(54) SELF RECOVERY IN A SOLID STATE DRIVE

(71) Applicant: Seagate Technology LLC, Cupertino, CA (US)

(72) Inventors: Leonid Baryudin, San Jose, CA (US); Earl T. Cohen, Oakland, CA (US); Alex G. Tang, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 153 days.

(21) Appl. No.: 13/796,264

(22) Filed: Mar. 12, 2013

(65) Prior Publication Data

US 2014/0258587 A1    Sep. 11, 2014

Related U.S. Application Data

(60) Provisional application No. 61/773,337, filed on Mar. 6, 2013.

(51) Int. Cl.
G06F 13/00    (2006.01)
G06F 13/28    (2006.01)
G06F 12/02    (2006.01)

(52) U.S. Cl.
CPC .... *G06F 12/0246* (2013.01); *G06F 2212/7201* (2013.01); *G06F 2212/7209* (2013.01)

(58) Field of Classification Search
CPC .................. G06F 12/0246; G06F 2212/7201; G06F 2212/7209
USPC ................................... 711/103, 202, E12.008
See application file for complete search history.

(56) References Cited

U.S. PATENT DOCUMENTS

| 7,516,267 | B2 | 4/2009 | Coulson et al. ............... 711/103 |
|---|---|---|---|
| 8,041,991 | B2 | 10/2011 | McKean ...................... 714/6.32 |
| 8,341,340 | B2 | 12/2012 | Rub ............................. 711/103 |
| 2007/0005928 | A1* | 1/2007 | Trika et al. ..................... 711/202 |
| 2009/0172265 | A1* | 7/2009 | Park et al. ..................... 711/103 |
| 2012/0005443 | A1* | 1/2012 | Flynn et al. ................... 711/163 |
| 2012/0233523 | A1 | 9/2012 | Krishnamoorthy ........... 714/758 |

* cited by examiner

*Primary Examiner* — Edward Dudek, Jr.
(74) *Attorney, Agent, or Firm* — Christopher P. Maiorana, PC

(57) ABSTRACT

An apparatus having a nonvolatile memory and a controller. The memory stores information in multiple pages. The information includes data units and headers. Each data unit is associated with a respective identifier in an address space of the apparatus and a respective location in the memory, has a respective header having the respective identifier, and is associated with a respective time stamp. Multiple headers include ones of the time stamps. The controller is configured to (i) read information stored in the pages, (ii) determine an order in which the data units were written based on the time stamps, (iii) locate based on the order (a) each last-written occurrence of the respective identifiers and (b) the respective locations of the data units associated with the last-written occurrences, and (iv) rebuild a map of the controller according to the respective locations of each last-written occurrence of each respective identifier.

20 Claims, 10 Drawing Sheets

SELF RECOVERY IN A SOLID STATE DRIVE

The present application is related to co-pending international application PCT/US2012/058583, international filing date of Oct. 4, 2012, which is incorporated by reference.

FIELD OF THE INVENTION

The invention relates to nonvolatile memory generally and, more particularly, to a method and/or apparatus for implementing a self recovery in a solid-state drive.

BACKGROUND

A multi-level map structure is used in some conventional solid-state drives to look up physical locations of logical block addresses on a nonvolatile media. The map information is regularly checkpointed. The checkpoint of higher-levels of the multi-level map enables fast boot times since only a small amount of metadata (i.e., the higher levels) is read to enable the drive to respond to host accesses of the logical block addresses. However, an ability to read user data becomes vulnerable with respect to any inaccuracy in the map. If the map loses synchronization due to any firmware problems and/or corruption, some amount or even all of the user data can be rendered inaccessible.

SUMMARY

The invention concerns an apparatus having a nonvolatile memory and a controller. The memory stores information in multiple pages. The information includes data units and headers. Each data unit is associated with a respective identifier in an address space of the apparatus and a respective location in the memory, has a respective header having the respective identifier, and is associated with a respective time stamp. Multiple headers include ones of the time stamps. The controller is configured to (i) read information stored in the pages, (ii) determine an order in which the data units were written based on the time stamps, (iii) locate based on the order (a) each last-written occurrence of the respective identifiers and (b) the respective locations of the data units associated with the last-written occurrences, and (iv) rebuild a map of the controller according to the respective locations of each last-written occurrence of each respective identifier.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Embodiments of the invention include providing a self recovery in a solid-state drive (e.g., SSD) that may (i) use block headers to save code rates and encryption salts for future recovery, (ii) recover a solid-state drive map when all metadata is corrupted, inconsistent or otherwise damaged, (iii) restore a solid-state drive R-block used space, (iv) initiate the self recovery procedure automatically, (v) recover latest content of user data, (vi) send recovered user data a host to be stored in a different storage device and/or (vii) be implemented in one or more integrated circuits.

Self recovery is based on data headers, block headers and epoch headers written with user data and containing information suitable to restore a map of the solid-state drive (or input/output device). An option is provided for a host to recover the latest content of the user data and copy the recovered user data to a different location, such as on a different solid-state drive. Such user data recovery is managed by the host. The latest content of the user data refers, for example, to the last-written data at each of a plurality of logical block addresses in an address space of the solid-state drive.

Figure 1:
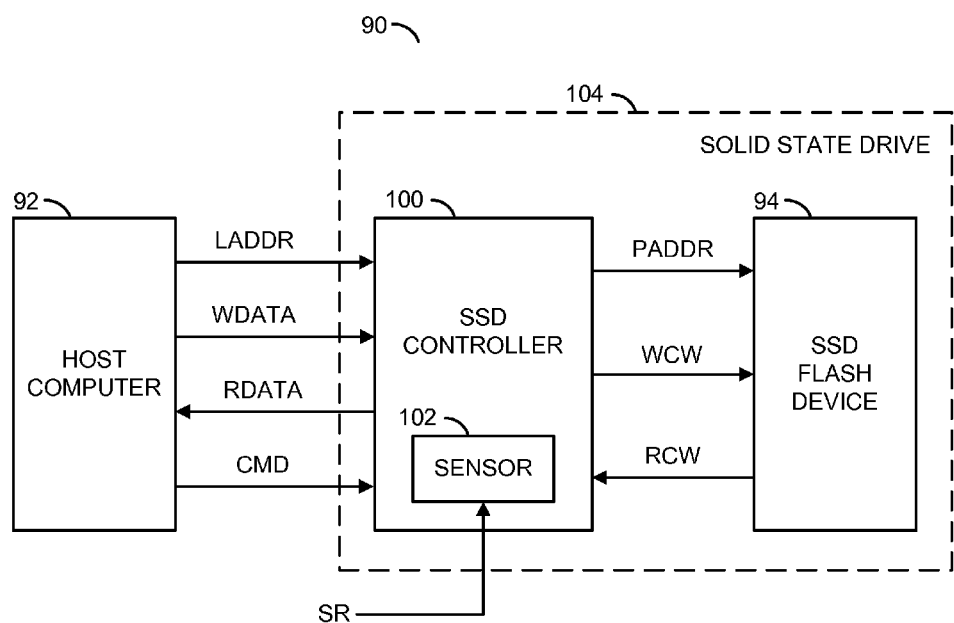
FIG. 1 is a block diagram of an example implementation of an apparatus.

Referring to FIG. 1, a block diagram of an example implementation of an apparatus 90 is shown. The apparatus (or circuit or device or integrated circuit) 90 implements a computer having a nonvolatile memory circuit. The apparatus 90 generally comprises a block (or circuit) 92, a block (or circuit) 94 and a block (or circuit) 100. The circuits 92 to 100 may represent modules and/or blocks that may be implemented as hardware, software, a combination of hardware and software, or other implementations.

A signal (e.g., LADDR) is generated by the circuit 92 and received by the circuit 100. The signal LADDR implements an address signal used to access data. A signal (e.g., PADDR) is generated by the circuit 100 and received by the circuit 94. The signal PADDR implements an address signal used to access data in the circuit 94. A signal WDATA is generated by the circuit 92 and presented to the circuit 100. The signal WDATA generally conveys write data to be written into the circuit 94. A signal (e.g., WCW) is generated by the circuit 100 and transferred to the circuit 94. The signal WCW carries error correction coded (e.g., ECC) write codewords written into the circuit 94. A signal (e.g., RCW) is generated by the circuit 94 and received by the circuit 100. The signal RCW carries ECC codewords read from the circuit 94. A signal (e.g., RDATA) is generated by the circuit 100 and presented to the circuit 92. The signal RDATA carries error corrected versions of the data in the signal RCW. A signal (e.g., CMD) is generated by the circuit 92 and received by the circuit 100. The signal CMD is asserted by circuit 92 to instruct the circuit 100 to initiate a self recovery. A signal (e.g., SR) is received by a sensor 102 of the circuit 100. The signal SR may be a manual input that when asserted instructs the circuit 100 to initiate a self recovery.

The circuit 92 is shown implemented as a host circuit. The circuit 92 is generally operational to read and write data to and from the circuit 94 via the circuit 100. When reading or writing, the circuit 92 places an address value (e.g., a logical address) in the signal LADDR to identify which set of data is to be written or to be read from the circuit 94. The write data is presented in the signal WDATA. The read data requested by the circuit 92 is received via the signal RDATA.

The circuit 94 is shown implemented as a nonvolatile memory circuit. In some embodiments, the circuit 94 may be an NAND flash device. In other embodiments, the circuit 94 may be implemented as all or a portion of a solid-state drive having one or more nonvolatile devices. The circuit 94 is generally operational to store data in a nonvolatile condition. When data is read from the circuit 94, the circuit 94 accesses a set of data (e.g., multiple bits) identified by an address (e.g., a physical address) in the signal PADDR. The signal PADDR generally spans an address range of the circuit 94.

The circuit 100 is shown implemented as a controller circuit. The circuit 100 is generally operational to control reading to and writing from the circuit 94, such as in response to commands received from the circuit 92. The circuit 100 may be implemented as one or more integrated circuits (or chips or die) in any controller used for controlling one or more solid-state drives (e.g., 104), embedded storage, or other suitable control applications.

The circuit 100 includes an error correction coding (e.g., ECC) capability and an error detection and correction (e.g., EDC) capability. The error correction coding may be used to add additional bits to sets of data received in the signal WDATA. The extra bits generally enable the detection and ultimate correction of one or more bits that may become corrupted between a write and one or more subsequent reads. The ECC data (e.g., the original data plus the extra bits) may be presented in the signal WCW.

The error detection and correction capability provides an ability to detect when one or more bits read from the circuit 94 and communicated in the signal RCW have been corrupted (e.g., flipped). The error detection and correction capability also corrects a number of the corrupted bits. The corrected data are presented in the signal RDATA.

According to various embodiments, the signal WDATA is transformed to the signal WCW by one or more of: encoding via one or more error correction codes; compression; encryption; scrambling; formatting to fit into pages of circuit 94; and other transformations. According to various embodiments, the signal RCW is transformed to the signal RDATA by one or more of: decoding via one or more error correction codes; decompression; decryption; unscrambling; extraction of formatted information from pages of 94; and other inverse transformations.

In various embodiments, the circuit 100 reads information stored in a plurality of pages of the circuit 94 when a self recovery operation is initiated. The information comprises a plurality of data units and a plurality of headers. Each data unit is associated with a respective logical block identifier in a logical block address space of the circuit 94 and a respective physical (or media address) location in circuit 94. Each data unit has a respective one of the data headers comprising the respective identifier. Each data unit is associated with a respective one of multiple time stamps. At least some R-block headers comprise ones of the time stamps. The circuit 100 subsequently determines an order in which the data units were written to the circuit 94 based on said time stamps. Based on the order, a location of (i) each last-written occurrence of the respective identifiers and (ii) the respective locations of the data units associated with the last-written occurrences are determined. The circuit 100 rebuilds the map of the circuit 94 according to the respective locations of each last-written occurrence of each respective identifier.

An R-block is a collection of nonvolatile memory blocks (e.g., a block from each nonvolatile memory die in the circuit 94, the nonvolatile memory locations within the blocks being written in a striped fashion). A band is a collection of R-blocks that information is serially written into (e.g., in a specific time order), and is optionally populated with information having similar properties and/or characteristics. A stream is a band managed such that, within the band, information is written to the circuit 94 in the same order that the information is presented for writing into the nonvolatile memory (e.g., information presented at an earlier time is written before information presented at a later time). A block is a smallest quantum of erasing. A page is a smallest quantum of writing. A read unit is a smallest quantum of reading and error correction. According to various embodiments, each page and/or each of a plurality of groups of pages includes an integral number of read units.

Figure 2:
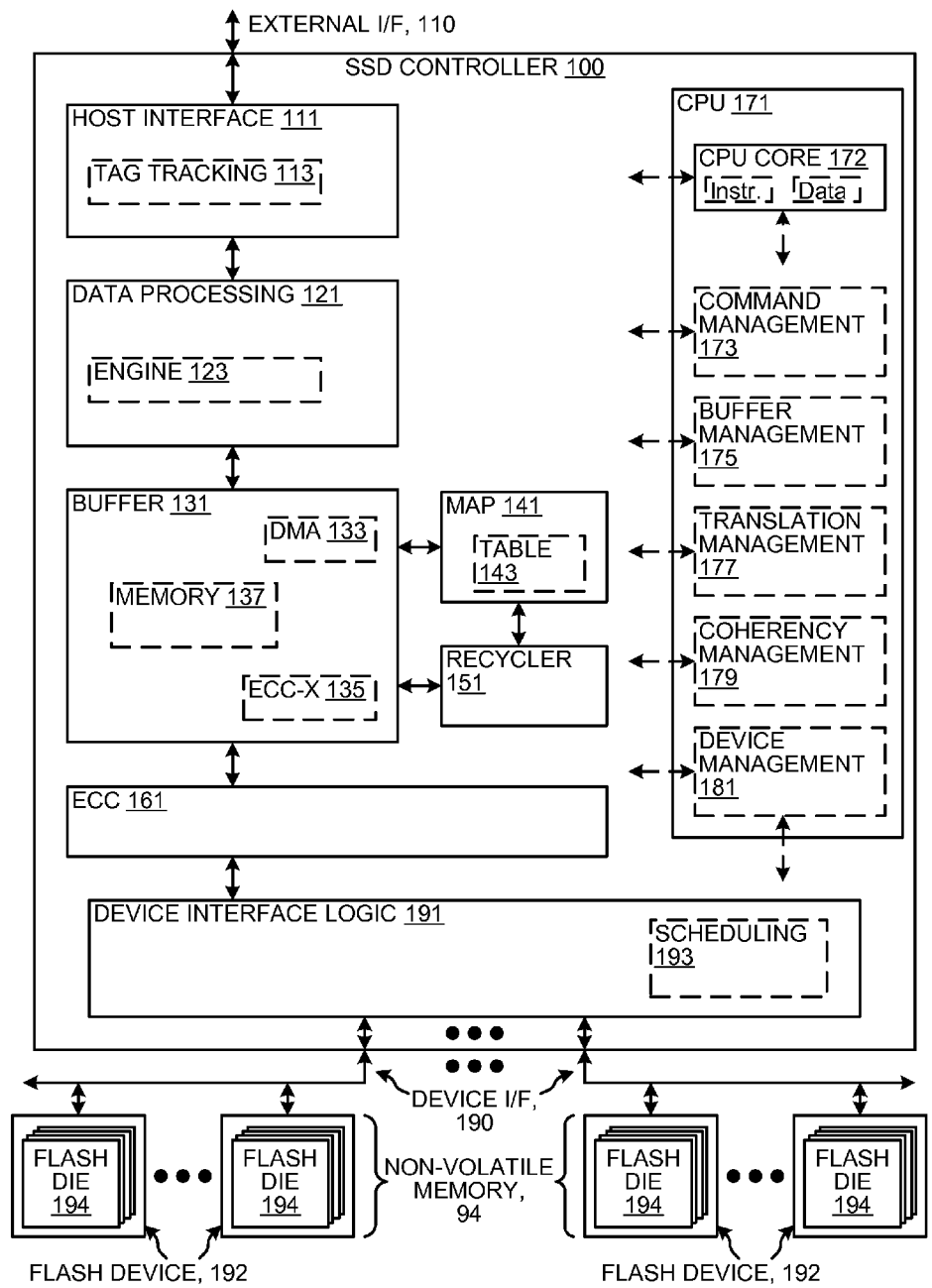
FIG. 2 is a diagram of an example implementation of a controller in accordance with an embodiment of the invention.

Referring to FIG. 2, a diagram of an example implementation of the circuits 94 and 100 is shown in accordance with an embodiment of the invention. The circuit 100 is communicatively coupled via one or more external interface (or ports) 110 to the circuit 92. The interfaces 110 is generally implemented as one or more of: a serial AT attachment (e.g., SATA) interface; a serial attached small computer system interface (e.g., SAS) interface; a peripheral component interconnect express (e.g., PCie) interface; a Fibre Channel interface; an Ethernet Interface (such as 10 Gigabit Ethernet); a nonstandard version of any of the preceding interfaces; a custom interface; or any other type of interface used to interconnect storage and/or communications and/or computing devices.

The circuit 100 is also communicatively coupled via one or more device interfaces (or ports) 190 to the circuit 94. The circuit 94 generally includes one or more storage devices, such as one or more of flash device blocks (or circuits) 192. The interfaces 190 is generally implemented as one or more of: an asynchronous interface; a synchronous interface; a single data rate (e.g., SDR) interface; a double data rate (e.g., DDR) interface; a dynamic random access memory (e.g., DRAM) compatible DDR or DDR2 synchronous interface; an open NAND flash interface (e.g., ONFI) compatible interface, such as an ONFI 2.2 or ONFI 3.0 compatible interface; a toggle-mode compatible flash interface; a nonstandard version of any of the preceding interfaces; a custom interface; or any other type of interface used to connect to storage devices.

Each circuit 192 generally includes one or more individual flash die (or circuits) 194. Multiple circuits 194 may be optionally and/or selectively accessible in parallel. The circuit 192 may be configured to couple to circuit 100 communicatively. Any type of storage device may be implemented in the circuit 192, such as a single-level cell (e.g., SLC) NAND flash memory, a multi-level cell (e.g., MLC) NAND flash memory, a NOR flash memory, flash memory using polysilicon or silicon nitride technology-based charge storage cells, two-dimensional or three-dimensional technology-based flash memory, read-only memory (e.g., ROM), static random access memory (e.g., SRAM), dynamic random access memory (e.g., DRAM), ferromagnetic memory, phase-change memory, racetrack memory, resistive RAM (e.g., ReRAM), or any other type of memory device or storage medium.

The interfaces 190 are generally organized as: one or more busses with one or more of the circuits 192 per bus; one or more groups of busses with one or more of the circuits 192 per bus, where busses in a group are generally accessed in parallel; or any other organization of one or more of circuits 192 onto the interfaces 190.

The circuit 100 generally comprises one or more blocks, such as host interface blocks (or circuits) 111, data processing blocks (or circuits) 121, a buffer block (or circuit) 131, a map block (or circuit) 141, a recycler block (or circuit) 151, an error correction code (e.g., ECC) block (or circuit) 161, a device interface logic block (or circuit) 191, and a central processing unit (e.g., CPU) block (or circuit) 171.

The circuits 111 send and receive commands and/or data via the interfaces 110, and may track progress of individual commands via a tag tracking block (or circuit) 113. The commands may include a read command specifying an address (such as a logical block address (e.g., LBA)) and an amount of data (such as a number of logical block address quanta or sectors) to read. In response to the read command, the circuit 100 may provide read status and/or read data. The commands may also include a write command specifying an address (such as a logical block address) and an amount of data (such as a number of logical block address quanta or sectors) to write. In response to the write command, the circuit 100 generally provides a write status and/or requests write data and optionally subsequently provides write status. The commands may include a deallocating command (e.g., a trim command) specifying one or more addresses (such as one or more logical block addresses) that should no longer be allocated. In response to the deallocating command, the circuit 100 may modify the map accordingly and optionally provides a deallocating status.

The circuit 121 optionally and/or selectively processes some or all of the data sent between the circuit 131 and the interfaces 110. The circuit 121 optionally and/or selectively processes data stored in the circuit 131. The circuit 121 generally uses one or more engine blocks (or circuits) 123 to perform one or more of: formatting; reformatting; transcoding; compression; decompression; encryption; decryption; and any other data processing and/or manipulation task.

The circuit 131 stores data sent to/from interfaces 110 and from/to the interfaces 190. The circuit 131 may additionally store system data, such as some or all map tables, used by the circuit 100 to manage one or more of the circuits 192. The circuit 131 generally includes one or more of: a memory block (or circuit) 137 used for temporary storage of data; a direct memory access (e.g., DMA) block (or circuit) 133 used to control movement of data to and/or from circuit 131; and an ECC-X block (or circuit) 135 used to provide higher-level error correction and/or redundancy functions; and other data movement and/or manipulation functions.

The circuit 161 optionally and/or selectively processes some or all data sent between the circuit 131 and interfaces 190. The circuit 161 optionally and/or selectively processes data stored in the circuit 131. The circuit 161 is configured to provide lower-level error correction and/or redundancy functions, such as in accordance with one or more ECC techniques. The circuit 161 implements one or more of: a cyclic redundancy check (e.g., CRC) code; a Hamming code; an Reed-Solomon (e.g., RS) code; a Bose, Ray-Chaudhuri and Hocquenghem (e.g., BCH) code; a low density parity check (e.g., LDPC) code; a Viterbi code; a trellis code; a hard-decision code; a soft-decision code; an erasure-based code; any error detecting and/or correcting code; and any combination of the preceding. The circuit 161 may include one or more decoders, such as low density parity check decoders.

The circuit 191 generally controls instances of the circuit 192 via the interfaces 190. The circuit 191 is configured to send data to/from the instances of the circuit 192 according to a protocol of the circuit 192. The circuit 191 generally includes a scheduling block (or circuit) 193 to selectively sequence control of the instances of the circuit 192 via the interfaces 190. The circuit 193 is configured to queue operations to the instances of the circuit 192, and to selectively send the operations to the individual instances of circuit 192 (or circuit 194) when available.

The circuit 141 is configured to convert between data addressing used on the interfaces 110 and data addressing used on the interfaces 190, using a table block (or circuit) 143 to map external data addresses to locations in the circuit 199. The circuit 141 converts logical block addresses used on the interfaces 110 to block and/or page addresses targeting one or more of the circuits 194, via mapping provided by the table 143. For logical block addresses that have never been written since drive manufacture or deallocation, the circuit 141 generally points to a default value to return if the logical block addresses are read. For example, when processing a deallocating command, the circuit 141 is modified so that entries corresponding to the deallocated logical block addresses point to the default value. Various default values may be implemented, each having a corresponding pointer. The default values generally enable reading some deallocated logical block addresses (such as in an initial range) as a particular default value, while reading other deallocated logical block addresses (such as in a subsequent range) as another default value. The default values may be defined by flash memory, hardware, firmware, command and/or primitive arguments and/or parameters, programmable registers, or various combinations thereof.

The circuit 141 is configured to use the table 143 to perform and/or to look up translations between addresses used on the interfaces 110 and data addressing used on the interfaces 190. The table 143 is implemented as one or more of: a one-level map; a two-level map; a multi-level map; a map cache; a compressed map; any type of mapping from one address space to another; and any combination of the foregoing. The table 143 generally includes one or more of: static random access memory; dynamic random access memory; nonvolatile memory (such as flash memory); cache memory; on-chip memory; off-chip memory; and any combination of the foregoing.

In some embodiments, the circuit 151 generally performs garbage collection. For example, instances of the circuit 192 contain blocks that should be erased before the blocks are re-writeable. The circuit 151 is configured to determine which portions of the instances of the circuit 192 are actively in use (e.g., allocated instead of deallocated), such as by scanning a map maintained by the circuit 141, and to make unused (e.g., deallocated) portions of the instances of circuit 192 available for writing by erasing the portions. The circuit 151 is also configured to move data stored within instances of circuit 192 to make larger contiguous portions of the instances of circuit 192 available for writing.

The circuit 192 is configured to be selectively and/or dynamically configured, managed, and/or used to have one or more bands for storing data of different types and/or properties. A number, arrangement, size, and type of the bands is dynamically changeable. For example, data from a computing host is written into a hot (e.g., active) band, while data from the circuit 151 may be written into a cold (e.g., less active) band. In some usage scenarios, if the computing host writes a long sequential stream, a size of the hot band may grow, whereas if the computing host does random writes or few writes, a size of the cold band may grow.

The circuit 171 is configured to control various portions of the circuit 100. The circuit 171 generally includes a CPU core block (or circuit) 172. The circuit 172 is implemented as one or more single-core and/or multi-core processors. Some or all of the individual processors cores in the circuit 172 may be multi-threaded. The circuit 172 generally includes instruction and/or data caches and/or memories. For example, the instruction memory may contain instructions to enable the circuit 172 to execute programs (e.g., program instructions, software and/or firmware) to control the circuit 100. Some or all of the instructions executed by the circuit 172 may be stored on instances of circuit 192.

The circuit 171 includes a command management block (or circuit) 173 to track and control commands received via interfaces 110 while the commands are in progress; a buffer management block (or circuit) 175 to control allocation and use of the circuit 131; a translation management block (or circuit) 177 to control the circuit 141; a coherency management block (or circuit) 179 to control consistency of data addressing and to avoid conflicts such as between external data accesses and recycle data accesses; a device management block (or circuit) 181 to control the circuit 191; and optionally other management units.

The circuit 171 is generally configured to perform other management tasks, such as one or more of: gathering and/or reporting performance statistics; controlling power sequencing, controlling and/or monitoring and/or adjusting power consumption; responding to power failures; controlling and/or monitoring and/or adjusting clock rates; and other management tasks.

Figure 3:
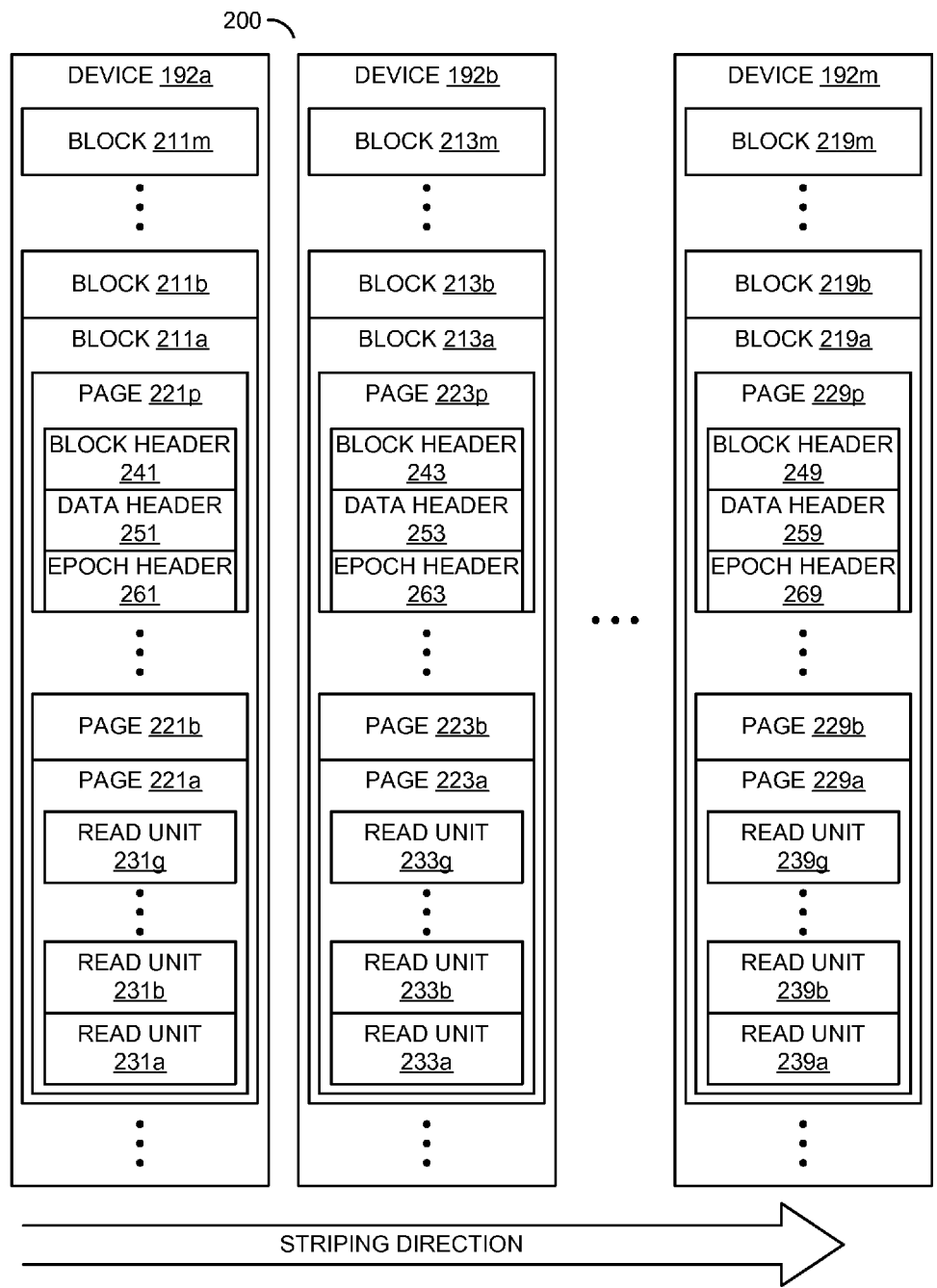
FIG. 3 is a diagram illustrating an example arrangement of a drive.

Referring to FIG. 3, a diagram illustrating an example arrangement 200 of the circuit 94 is shown. In one example, the circuit 94 comprises multiple nonvolatile memory devices 192a-192n embodying a number of blocks, pages, and read units. In various embodiments, data is striped independently across multiple groups of circuits 192a-192n, where each group of devices is independently accessible.

Each circuit 192a-192m provides storage organized as blocks (e.g., blocks 211a, 211b, . . . , and 211m of the circuit 192a; blocks 213a, 213b, . . . , and 213m of the circuit 192b; and so forth). The blocks in turn include pages (e.g., pages 221a, 221b, . . . , and 221p of block 211a; pages 223a, 223b, . . . , and 223p of block 211b; and so forth). The pages in turn include read units (e.g., read units 231a, 231b, . . . , and 231g of page 221a; read units 233a, 233b, . . . , and 233g of page 221b; and so forth). Some pages (e.g., initial pages 221p-229p) in some blocks (e.g., initial blocks 211a-219a) contain a respective block header 241-249. Each page 221a-229p selectively contains a respective data header 251-259 and a respective epoch header 261-269. Reads and/or writes of information in the circuits 192a-192m are performed according to an order, such as a 'read unit first' order or a 'page first' order.

In various embodiments, each page of the flash is divided into one or more ECC-pages (or simply Epages). Each Epage is an amount of user data and the corresponding ECC data that, together, comprise one ECC codeword (e.g., a correctable unit). Typically, there are an integer number of Epages per page of the flash, or in some embodiments, per multi-plane page. Since the Epages are the basic unit that can be read and corrected, Epages are also called "read units." Typically, read units may have 1 KB or 2 KB of user data, and an even share of the remaining bytes in the flash page (so that all read units are the same total size).

Figure 4:
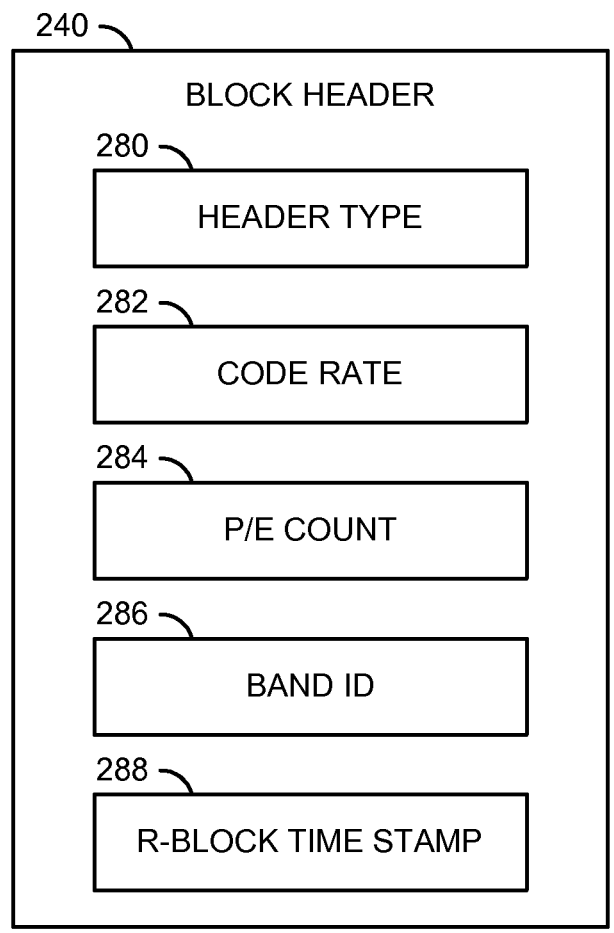
FIG. 4 is a diagram of an example implementation of a block header.

Referring to FIG. 4, a diagram of an example implementation of a block header 240 is shown. The block header 240 is illustrative of the block headers 241-249 shown in FIG. 3. The block header 240 generally comprises a header type value (or field) 280, a code rate value (or field) 282, a program/erase count value (or field) 284, a band identification value (or field) 286 and an R-block time stamp value (or field) 288. Other types and numbers of field may be implemented to meet the criteria of a particular application.

The initial page of each block is written using a predefined code rate (e.g., CR) 282, such as a predefined code rate selected for reliability, and with an encryption salt value that does not change over time (in some embodiments the encryption salt value may include the block number). Therefore, the initial page of each block can be read anytime even if checkpoint information comprising per-block code rates and/or encryption salt values is lost.

The block header 280 generally identifies the header as a block-type header. In some embodiments the code rate 282 for the block has the same numerical value as in adjacent dies 194 (e.g., the blocks belong to same R-block) to protect the information from being lost. The code rate 282 is used on the rest of the pages in the block.

The program/erase (e.g., P/E) count 284 contains the bits for the corresponding block (which, in some embodiments, are the same for all blocks in the same R-block). The program/erase count 284 is also used as at least a part of the encryption salt for other pages in the block. The band identification (e.g., ID) 286 identifies which band the block (e.g., the entire R-block) belongs to.

The R-block time stamp (e.g., RTS) 288 is unique among all R-blocks values and is incremented every time the solid-state drive starts to write new R-block. The incrementing enables, as part of recovery, a read of the R-block data in deterministic order with respect to the order data has been written.

By providing the block header information in the initial page in each block, and by providing the block header information in a reliable way that enables the initial page to be read independent of checkpoints, an ability to recover without checkpoints is enhanced. Using a more reliable code rate 282 for the initial page (containing the block header 240) increases the probability of being able to read the initial page, even in the presence of a high error rate. Further, the recovery infrastructure has the initial page not encrypted with the encryption salt that is not known a priori, and thus the flash randomization feature of encrypting using the program/erase count 284 as part of the salt is not available, leading to a greater ability to recover by ensuring the initial pages are readable without additional information.

In various embodiments, the "initial" page could be any known page of the block. In further embodiments, selecting a middle page of the block as the page having the predefined code rate 282 and containing the block header 240 is advantageous, as some nonvolatile memory middle pages have lower error rates than end pages.

Figure 5:
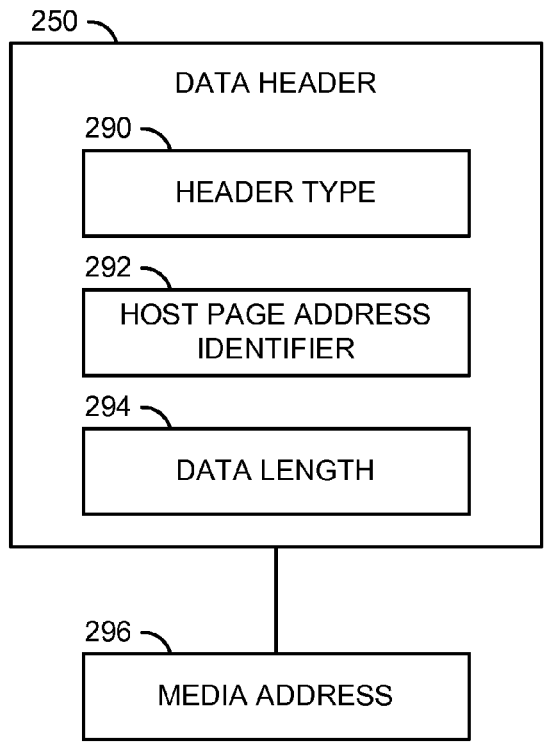
FIG. 5 is a diagram of an example implementation of a data header.

Referring to FIG. 5, a diagram of an example implementation of a data header 250 is shown. The data header 250 is illustrative of the data headers 251-259 shown in FIG. 3. The data header 250 generally comprises a header type value (or field) 290, a host page address identifier value (or field) 292 and a data length value (or field) 294. Other types and numbers of field may be implemented to meet the criteria of a particular application. Each data header 250 is stored at a respective media (or physical) address 296 within the circuit 94. The term host page address is used to distinguish that the mapping between logical block addresses and physical locations in the nonvolatile memory is on a granularity that is optionally larger than logical blocks. For example, in some usage scenarios, eight consecutive logical blocks are treated as one host page (e.g., eight, consecutive 512B SATA sectors are treated as a 4 KB unit) for purposes of mapping.

The data header 250 is sent to the circuit 94 with each host page. The data header 250 contains information used to extract data and recovery map information for the corresponding host page. The header type 290 generally identifies the header as a data-type header. In some embodiments, the host page address (e.g., HPA) corresponds to the address of the first logical block address in the host page. The data length (e.g., DL) 294 is the length of the host page on the media. The data length 294 is used to both read data and recover the map if a type of data compression is used, in which case, the host page data size on the media does not match a number of sectors that the host page contains.

In various embodiments, the data length 294 contents together with the media address (e.g., MA) 296 may be sufficient to recreate an entry, such as a second-level map (e.g., SLM) entry, for the host page. The host page address 292 is used to determine the second-level map page and the second-level map entry inside the second-level map page. Additional details for the second-level map entries may be found in co-pending international application PCT/US2012/058583, which is hereby incorporated by reference in its entirety.

Figure 6:
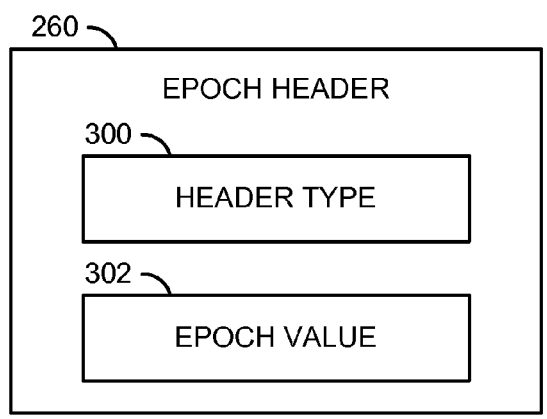
FIG. 6 is a diagram of an example implementation of an epoch header.

Referring to FIG. 6, a diagram of an example implementation of an epoch header 260 is shown. The epoch header 260 is illustrative of the epoch headers 261-269 shown in FIG. 3. The epoch header 260 generally comprises a header type value (or field) 300 and an epoch value (or field) 302. Other types and numbers of field may be implemented to meet the criteria of a particular application.

The header type 300 generally identifies the header as an epoch-type header. The epoch value 302 is incremented when a host page is being written, and each host page write is associated with a respective epoch value. The epoch value 302 generally has enough bits not to wrap around for a lifetime of the drive. For example, 60 bits are generally sufficient for current and possible future storage interfaces speed. Even if the circuit 92 writes at 1 terabyts per second and each host page is 1 kilobyte in size (meaning 1 billion host pages are written each second) the 60-bit epoch value 302 will take approximately 10,000 days (approximately 30 years) to wrap around.

The epoch value of the circuit 100 that was current when a host page is written is the epoch value 302 associated with the host page. The epoch values 302 are stored in the data bands such that the respective epoch value of each host page stored in the data bands is determinable during recovery. In some embodiments, each epoch header 260 is sent together with a corresponding data header 250 of the host page.

In other embodiments, each epoch header 260 may not be sent with each host page as long as some recent epoch header 260 and all next host pages have sequential epoch values (e.g., incremented by 1 from one host page to the next host page). The epoch header 260 will be sent if there is "jump" (change by more than 1) in the epoch value. Such a jump is an indication, for example, that one or more host pages have been written into another band.

In various embodiments epoch headers 260, containing epoch values 302, are sent into the data bands in a way that guarantees unambiguous associating of each host page with a respective epoch value by reading the data headers 250 and the epoch headers 260 from the bands.

Figure 7:
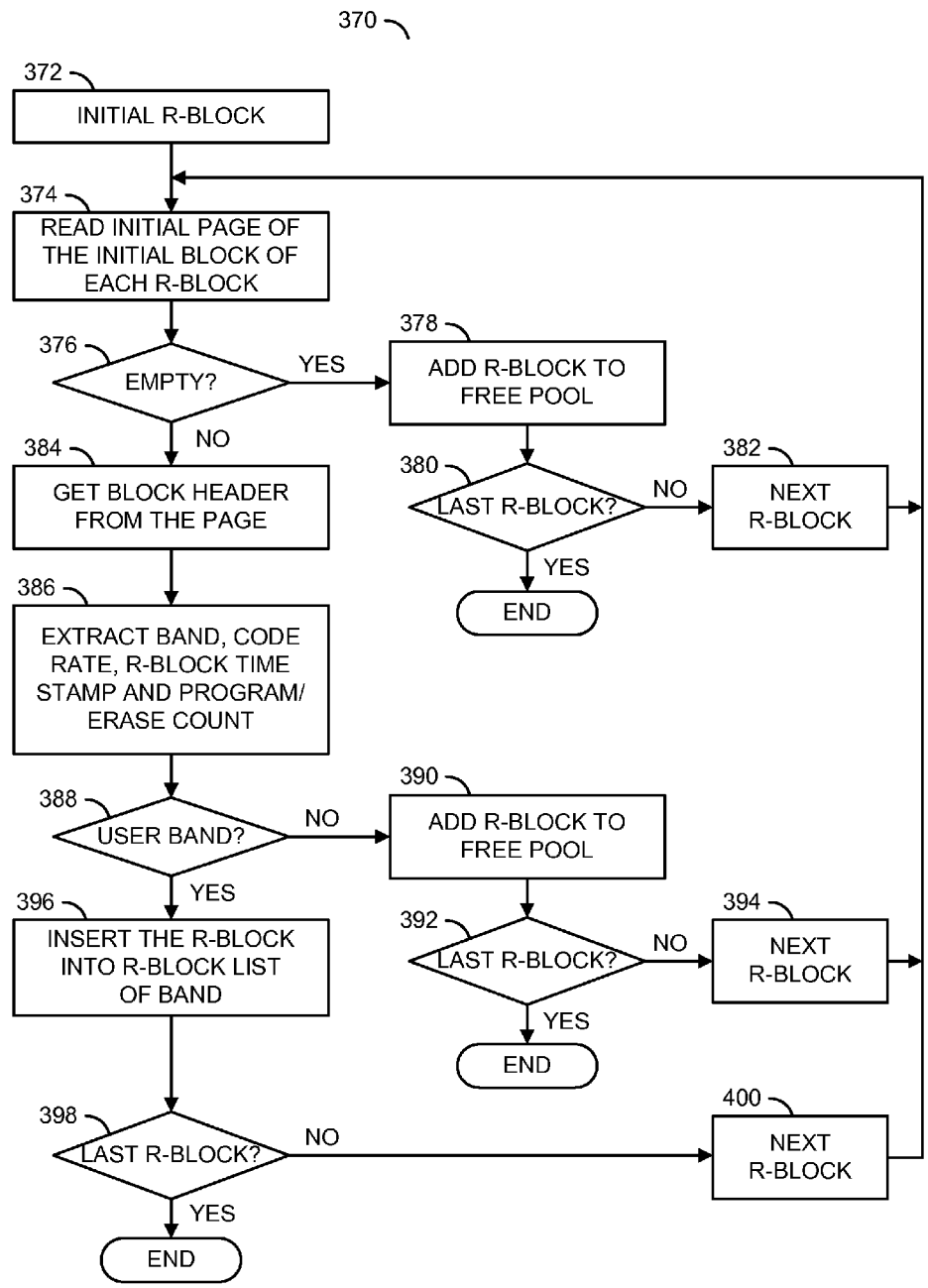
FIG. 7 is a flow diagram of an example method for creating free pools and recovery lists.

Referring to FIG. 7, a flow diagram of an example method 370 for creating free pools and recovery lists is shown. The method (or process) 370 is implemented by the circuits 94 and 100. The method 370 generally comprises a step (or state) 372, a step (or state) 374, a step (or state) 376, a step (or state) 378, a step (or state) 380, a step (or state) 382, a step (or state) 384, a step (or state) 386, a step (or state) 388, a step (or state) 390, a step (or state) 392, a step (or state) 394, a step (or state) 396, a step (or state) 398, a step (or state) 400. The steps 372 to 400 may represent modules and/or blocks that may be implemented as hardware, software, a combination of hardware and software, or other implementations. The sequence of the steps is shown as a representative example. Other step orders may be implemented to meet the criteria of a particular application.

In embodiments where the goal is to recover the map on the drive itself, the solid-state drive uses free space (e.g., free R-blocks) to keep newly written map and checkpoint data. One or more former map R-blocks can be used because the old map can be discarded. The same R-blocks will eventually house the map that will be restored. Many writes may take place during the map recovery. For randomly written data, each second-level map page might be overwritten many (e.g., hundreds) of times. Therefore, some R-blocks will be recycled before the recovery ends. If data R-blocks have free space (and after one or more particular R-blocks have been processed and whatever valid host pages were present have been restored to the map), such R-blocks can be recycled and reused. If the map bands plus the free R-blocks constitute enough space, the recovery may be performed without touching (e.g., rewriting and recycling) any data. Erased (empty) R-blocks can be used for the same purpose.

In the step 372 an initial R-block is selected. An initial page of the initial block of each R-block is read in the step 374. If the block is empty per the step 376, such as by being in the erased state, the R-block is added to the free pool in the step 378. A check for the last R-block is performed in the step 380. If another R-block is available, the next R-block is selected in the step 382. The method 370 continues with the step 374 to process the next R-block.

If the block is not empty, the block header 240 is read in the step 384. From the block header data, the band ID 286, the code rate 282, the R-block time stamp 288 and the program/erase count 284 are extracted. If the band is not a user band per the step 388, the R-block is added to the free pool in the step 390. A check for the last R-block is performed in the step 392. If another R-block is available, the next R-block is selected in the step 394. The method 370 continues with the step 374 to process the next R-block.

In the band is the user band, an order is calculated and the R-block is inserted into the R-block list of bands in the step 396 for future recovery. The insertion is done in a deterministic order with respect to the R-block time stamp. In some embodiments, the R-blocks are sorted in R-block time stamp ascending order (e.g., R-blocks with smaller R-block time stamp first). In other embodiments, the R-blocks are sorted in R-block time stamp descending order (e.g., R-blocks with bigger R-block time stamp first). A check for the last R-block is performed in the step 398. If another R-block is available, the next R-block is selected in the step 400. The method 370 continues with the step 374 to process the next R-block. The method 370 ends after the last R-block is processed.

Figure 8:
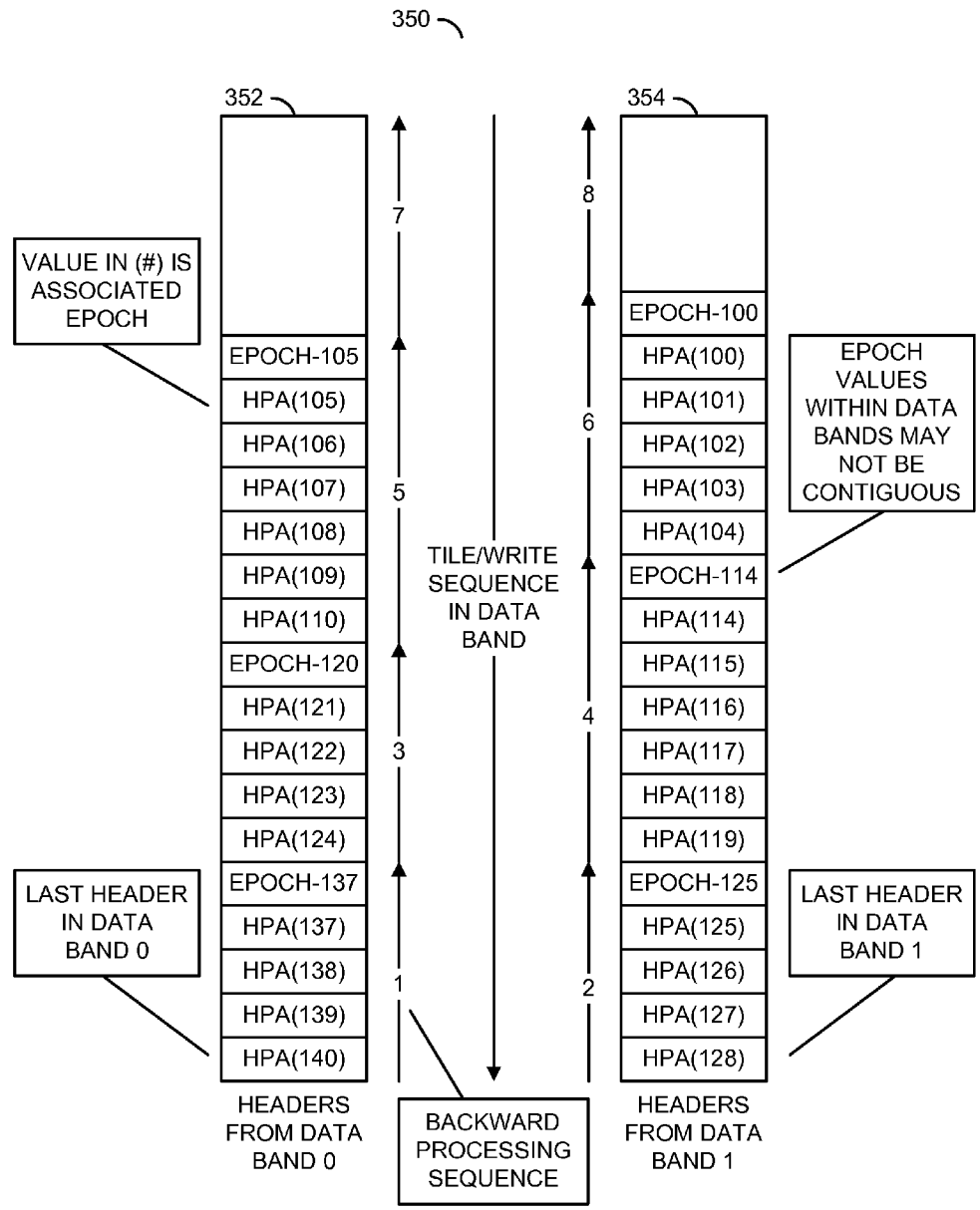
FIG. 8 is a diagram of an example implementation of a multiple band data processing.

Referring to FIG. 8, a diagram of an example implementation of a multiple band data processing 350 is shown. After the free pool and recovery lists are created, an R-block list (e.g., lists 352 and 354) exists per band (e.g., band 0 and band 1), sorted either in ascending or descending order with respect to the R-block time stamp. Because inside any R-block data is written in timely order, reading an R-block from first page to last (e.g., in forward order) will yield host pages in the order the pages were written into the R-block. Reading an R-block from last page to first (e.g., in backward order) will yield host pages in the order exactly opposite to that in which the host pages were written into the R-block.

When multiple band lists are used, the multiple bands are traversed in order by epoch value (either incrementing for forward order or decrementing for backward order) to replay the sequence of host page writes in the desired order. The epoch headers 260 enable walking multiple bands in parallel in an order according to the respective epoch value of the host pages in the multiple bands.

In some embodiments where the R-blocks in the band lists 352 and 354 are sorted in ascending order with respect to the R-block time stamp, reading each R-block forward and walking over the R-blocks in the band lists 352 and 354 yield all host pages exactly in the same order the host pages were written into this specific band. Each time some particular host page address is discovered via data header 250, a map entry associated with the discovered host page address is updated. Therefore, on completion of the forward walk, the map that is being restored based on the data header 250 information (e.g., media address 296 and data length 294) points to the latest (e.g., last-written) version of each host page address (e.g., logical block address).

In embodiments where the goal is to recover the latest content of user data and where R-blocks in the band lists 352 and 354 are sorted in ascending order with respect to the R-block time stamp, data of a host page can be read by the host each time any particular host page address is discovered. The host may not remember whether the particular host page address has been encountered already. For example, by replaying the host pages in forward order and having the host write the sequence of host pages to an other solid-state drive, contents of the solid-state drive being recovered would be restored on the other solid-state drive when the forward walk was complete, though in the process some host page addresses might have been written more than one time.

In other embodiments where R-blocks in the band lists 352 and 354 are sorted in descending order with respect to the R-block time stamp, reading each R-block backward and walking over R-blocks in the band list yields host pages in the order exactly opposite to that in which the host pages have been written into the specific band. With such a "backward" order of reading the data headers 250 of the host pages, the map is updated only when any particular host page address is discovered for the first time (e.g., the latest instance of the particular host page). Therefore, the map that is being restored based on the data header 250 information (e.g., media address 296 and data length 294) will point to the latest version of each host page address (e.g., logical block address). Walking data in the backward order may be more beneficial in such embodiments because each map entry is written not more than once thus reducing media wear and recovery time.

In the embodiments where the goal is to recover the latest content of user data and where R-blocks in the band lists are sorted in descending order with respect to the R-block time stamp, data of the host page can be read by the host when any particular host page address is discovered for the first time (e.g., the latest instance of the particular host page). The host may maintain a bitmap (e.g., 1 bit per host page) indicating whether the particular host page address has been encountered already. The host may store the host page location on the media to recover the map. For example, by replaying the host pages in backward order and having the host write the sequence of host pages to an other solid-state drive, contents of the solid-state drive being recovered would be restored on the other solid-state drive when the backward walk was complete, and each host page would only have been written one time.

In other embodiments where the goal is to recover the latest content of user data regardless of which band walking order is chosen, the host can store the media address location 296 and the data length 294 (e.g., recovered map entry) for the host page and after all of the map information is fully recovered, read the entire user data just once.

In further embodiments where just a single data band is present the R-block list of bands, created as described above is enough to guarantee correct data read sequence. In yet other embodiments where multiple data bands exist, the epoch headers 260 provide a mechanism to establish a data order between the bands.

In some embodiments a complication related to the epoch headers 260 exists where the headers are not injected per host page, but rather when the solid-state drive switches data bands during writing of the host pages. During data band processing, the recovery associates the correct epoch value 302 for each data header 250 and walks forward or backwards in the data band to process and place the data header information into the map.

An amount of used space per R-block (e.g., RUS) may be ignored when finding a best candidate for recycling. In such embodiments where the goal is to recover the map on the drive itself rendering the drive operational, the R-block used space is also recovered because with the checkpoint being lost, an R-block used space table is also lost. Before commencing the self recovery procedure, the R-block used space value for all R-blocks in the band lists is cleared (e.g., set to 0).

In some embodiments where the R-blocks in the band lists 352 and 354 are sorted in ascending order with respect to the R-block time stamp, when a certain host page address is encountered for the first time (e.g., does not exist in the map) a corresponding data length value 294 is added to the R-block used space of the R-block. Furthermore, when the same host page address is encountered again, the previous instance data length value 294 is subtracted from the R-block used space of the R-block, corresponding to the previous instance media address 296 (both values are extracted from the map), while the new data length value 294 is added to the R-block used space of the R-block.

In other embodiments where the R-blocks in the band lists 352 and 354 are sorted in descending order with respect to the R-block time stamp, when a certain host page address is encountered first time (e.g., does not exist in the map) the data length value 294 is added to the R-block used space of the R-block.

In further embodiments, R-block used space recovery can be done by reading through the recovered map during the end of the recovery process and by adding the data length 294 for each host page address to the R-block used space of particular R-block (e.g., the R-block value carne extracted from media address 296 saved in the second-level map entry).

Figure 9:
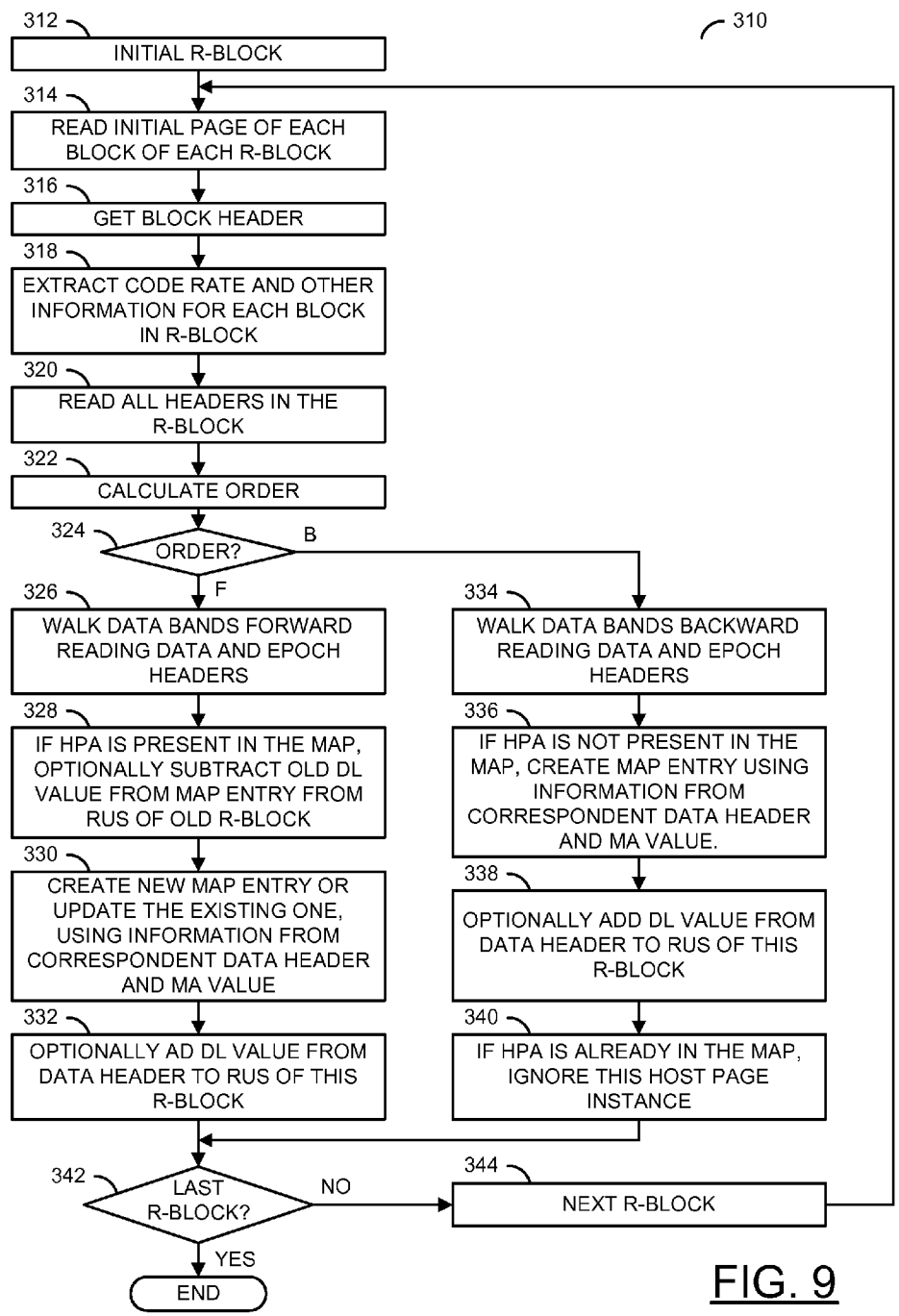
FIG. 9 is a flow diagram of an example method for map recovery.

Referring to FIG. 9, a flow diagram of an example method 310 for map recovery is shown. The method (or process) 310 is implemented by the circuits 94 and 100. The method 310 generally comprises a step (or state) 312, a step (or state) 314, a step (or state) 316, a step (or state) 318, a step (or state) 320, a step (or state) 322, a step (or state) 324, a step (or state) 326, a step (or state) 328, a step (or state) 330, a step (or state) 332, a step (or state) 334, a step (or state) 336, a step (or state) 338, a step (or state) 340, a step (or state) 342 and a step (or state) 344. The steps 312 to 344 may represent modules and/or blocks that may be implemented as hardware, software, a combination of hardware and software, or other implementations. The sequence of the steps is shown as a representative example. Other step orders may be implemented to meet the criteria of a particular application.

In embodiments where the goal is to recover map either on the drive itself (rendering the drive operational) or on the host (e.g., to enable reading the latest content from the drive), the map recovery method 310 is performed. In the step 312 an initial R-block is selected. An initial page of each block of each R-block, except those, allocated into the Free Pool initially, is read in the step 314. The block header is read in the step 316. In the step 318 the code rate and other information are extracted for each block in the R-block. Now the code rates for all blocks in the R-block and the encryption salt for the entire R-block are known and so all of the headers in the R-block are possible to read. In some embodiments, determining the code rates and the order of the R-blocks is performed in a separate procedure, such as illustrated with respect to FIG. 7.

In the step 322, an order is calculated to walk the data bands forward or backward to read the data headers 250 and the epoch headers 260. The data headers 150 contain the HPAs 292 and the data lengths 294. The epoch values 302 from the epoch headers 260 allow maintaining the epoch associated with each host page address. The media addresses 296 of each data header 250 are known after the data headers 250 are read.

If the R-blocks are sorted and the data is being read in forward direction per the step 324, the method 310 continues with the step 326. The data bands are walked in the forward direction in the step 326 reading the data headers 250 and epoch headers 260. If the host page address is present in the map, optionally subtract the old data length value 294 from the map entry from the R-block used space of the old R-block in the step 328. In the step 330, a new map entry associated with the host page address is created, or the existing entry is updated, using information from correspondent data header 250 and media address 296 value. The data length value 294 from the data header 250 is optionally added to the R-block used space of the R-block in the step 332.

If R-blocks are sorted and data is being read in the backward direction per the step 324, the method 310 continues with the step 334. The data bands are walked in the backward direction in the step 334 reading the data headers 250 and epoch headers 260. If a host page address is not present in the map (e.g., first instance of the host page), a map entry associated with the host page address is created in the step 336, using information from correspondent data header 250 and the media address value 296. The data length value 294 from the data header 250 is optionally added to the R-block used space of the R-block in the step 338. If the host page address is already in the map, ignore the current host page instance in the step 340. The older host page instance of the same host page address (e.g., logical block address) was overwritten and so is obsolete.

After walking through the bands in either direction, a check is made in the step 342 to determine if the last R-block has been considered. If not, the next R-block is selected in the step 344. The method 310 returns to the step 314 and processes the next R-block until the last R-block has been processed.

In some embodiments, the self recovery results in a complete map, containing first-level map (e.g., FLM) and second-level map (e.g., second-level map) components. A checkpoint, containing first-level map information, program/erase count, the R-block used space and all other information, is then created. Additional details for creating the checkpoints can be found in co-pending international application PCT/US2012/058583, which is hereby incorporated by reference in its entirety.

In some embodiments, rolling checkpoints are created as the map is being flushed out according to coherency rules, described in the international application PCT/US2012/058583. In such a case, a current state of the self recovery is added to the checkpoint. Therefore, restarting the self recovery from the point of interruption is possible. For example, if the solid-state drive loses power during the self recovery process the current state is available.

In other embodiments, the entire map information (e.g., the media address 296 and the data length 294 for each host page address ever written) is collected by the host (e.g., circuit 92). The map information is used by the host to read the entire user data and store the user data elsewhere.

Figure 10:
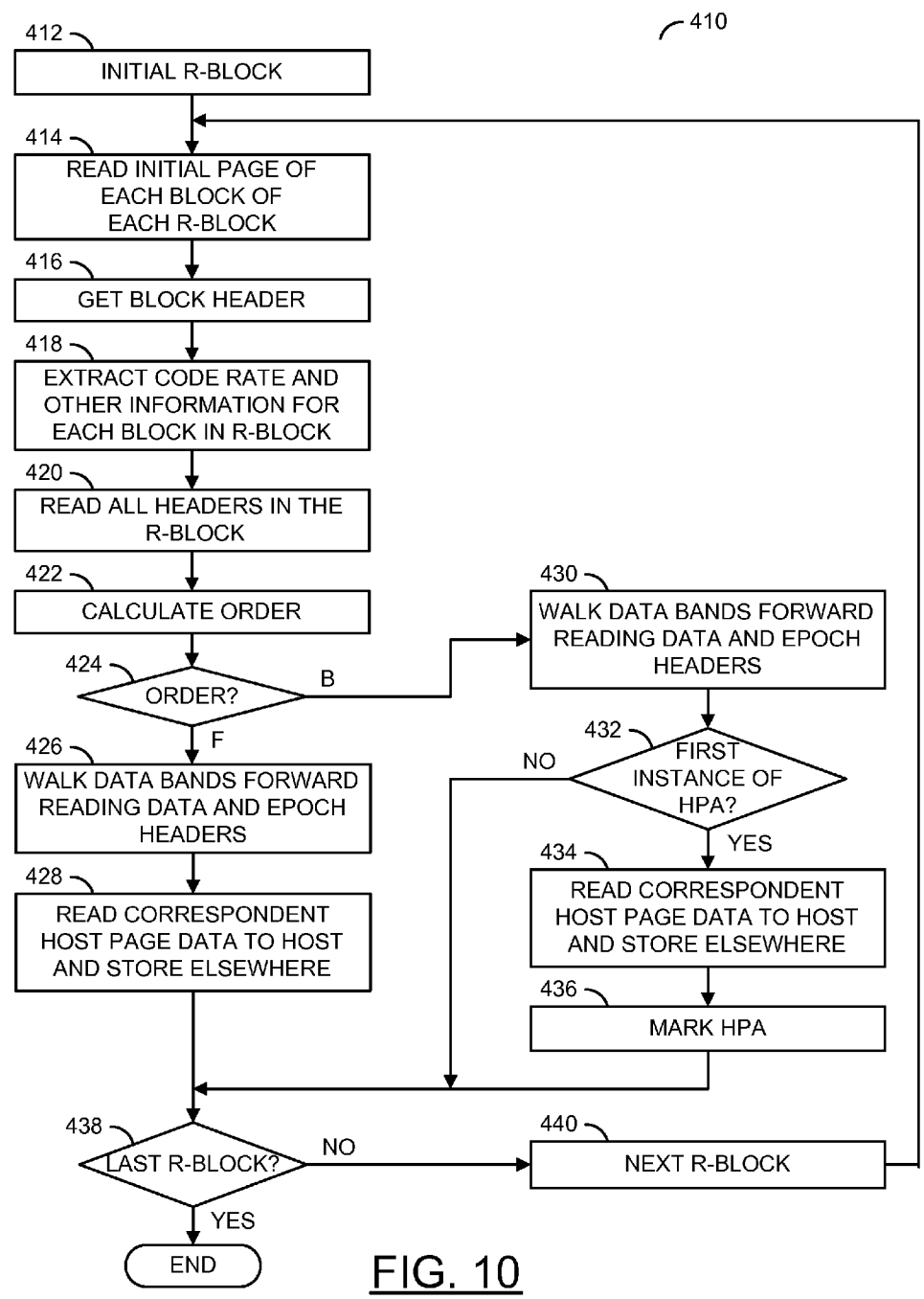
FIG. 10 is a flow diagram of an example implementation of a method for user data recovery.

Referring to FIG. 10, a flow diagram of an example implementation of a method 410 for user data recovery is shown. The method (or process) 410 is implemented by the circuits 94 and 100. The method 410 generally comprises a step (or state) 412, a step (or state) 414, a step (or state) 416, a step (or state) 418, a step (or state) 420, a step (or state) 422, a step (or state) 424, a step (or state) 426, a step (or state) 428, a step (or state) 430, a step (or state) 432, a step (or state) 434, a step (or state) 436, a step (or state) 438 and a step (or state) 440. The steps 412 to 440 may represent modules and/or blocks that may be implemented as hardware, software, a combination of hardware and software, or other implementations. The sequence of the steps is shown as a representative example. Other step orders may be implemented to meet the criteria of a particular application.

In embodiments where the goal is to recover the latest content of user data without recovering the map, the user data recovery method 410 is performed. In the step 412, an initial R-block is selected. The initial page of each block of each R-block, except the R-blocks allocated initially into the free pool, are read in the step 414. The block header 240 is read in the step 416. In the step 418, the code rate for each block in the R-block is extracted. Now, the code rate for all blocks in the R-block and the encryption salt for the entire R-block are known and reading all of the headers in the R-block is performed in the step 420. In the step 422, the order is calculated for the self recovery. In some embodiments, determining the code rates and the order of the R-blocks is performed in a separate procedure, such as illustrated with respect to FIG. 7.

A decision is made in the step 424 to walk the data bands forward or backward to read the data headers 250 and the epoch headers 260. The data headers 250 contain the host page address 292 and the data length 294 while the epoch values 302 from the epoch headers 260 allow maintaining the epoch associated with each host page address. The media address 296 of each data header 250 is thus known after the data header 250 is read.

If the R-blocks are sorted and data is being read in the forward direction per the step 426, the correspondent host page data is read to the host and stored elsewhere in the step 428, perhaps overwriting the data previously read for the host page.

If the R-blocks are sorted and data is being read in backward direction per the step 430, a check is made in the step 432 to determine if the initial instance of the host page address has just been read. If the first instance is encountered, the correspondent host page data is read to the host and stored elsewhere in the step 434. The host page address is marked (e.g., set a bit in the bitmap) in the step 436 to remember for the future.

A check is made in the step 438 to determine if the last R-block has been considered. If not, the next R-block is selected in the step 440. The method 410 returns to the step 414 and processes the next R-block until the last R-block has been processed.

Figure 11:
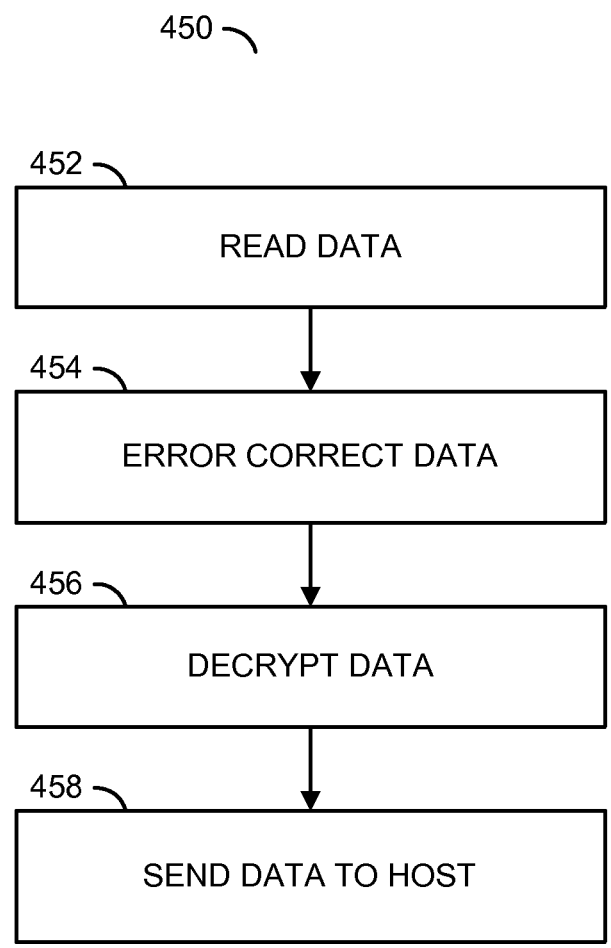
FIG. 11 is a flow diagram of an example implementation of a method for error correction and decryption.

Referring to FIG. 11, a flow diagram of an example implementation of a method 450 for error correction and decryption is shown. The method (or process) 450 is implemented by the circuits 94 and 100. The method 450 generally comprises a step (or state) 452, a step (or state) 454, a step (or state) 456 and a step (or state) 458. The steps 452 to 458 may represent modules and/or blocks that may be implemented as hardware, software, a combination of hardware and software, or other implementations. The sequence of the steps is shown as a representative example. Other step orders may be implemented to meet the criteria of a particular application.

In the step 452, the circuit 100 reads data from the circuit 94. Error correction of the data is performed in the step 454. Once the data has been corrected, the data is decrypted by the circuit 100 in the step 456. The decrypted data is subsequently sent to the circuit 92 in the step 458.

In some embodiments, the circuit 100 can start the self recovery procedure when a major discrepancy is encountered in metadata of the drive (e.g., the map and/or checkpoint). In other embodiments, activation of a physical sensor (e.g., dip switch, reed switch, etc.) on the drive will put the drive into the self recovery mode. A user boots the computer, stops the boot on a BIOS step by pressing a particular key (e.g., key F12) and waits until recovery is completed. Completion may be indicated by an optical signal.

In embodiments where a root file system of the solid-state drive is still preserved, the self recovery process can be performed by self recovery firmware (e.g., SRF) which is installed into the solid-state drive root file system at the drive manufacturing time or at a firmware update time. In further embodiments, or when the root file system is also corrupted or presence of the self recovery firmware on the drive is not desirable due to other reasons, the solid-state drive waits until the self recovery firmware is downloaded by a host application and subsequently perform the self recovery. In some embodiments, the self recovery firmware (saved on the drive or downloaded by the host) can be self sufficient to recover the map on the drive and return the drive to the operational state.

In other embodiments, the self recovery firmware has a simple design with part of the logic implemented on the host. The host reads the latest user data from the drive and save the user data elsewhere. Afterwards, the drive may be reformatted or secure erased. In an example, the self recovery firmware in some embodiments solely provides an ability to read and write raw data from specified NAND Flash locations and all processing is done on the host. In another example, the self recovery firmware in some embodiments additionally provides an ability, given a code rate value and an encryption salt value, to error correct and decrypt data read from the NAND Flash.

The circuits 94 and 100 use block headers to save the code rate and the encryption salt data for future recovery. Self recovery of the map is performed when the checkpoint and/or the map is corrupted, inconsistent and/or otherwise damaged. The self recovery optionally restores the solid-state drive R-block used space (e.g., R-block used space). The self recovery may also recover the latest content of user data to a host for storage in a different storage device.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store a plurality of time stamps associated with a plurality of data units in a plurality of bands, wherein (i) each of the bands comprises a plurality of blocks, (ii) each of the blocks comprises a plurality of memory pages, (iii) the memory pages are configured to store a plurality of host pages, (iv) each of the host pages comprises one or more of the data units, and (v) each of the host pages is associated with a respective identifier in a host address space, a respective location in a physical address space of the memory, and a respective epoch value; and
   a controller configured to (i) read the time stamps from the memory, (ii) generate a plurality of lists identifying an order in which the data units were written to the memory based on the time stamps, (iii) perform a sequence of reads of the respective identifiers from the bands based on the lists and the respective epoch values, (iv) locate each last-written occurrence of the respective identifiers based on the sequence of reads and (v) rebuild a map identifying where the data units are stored in the physical address space of the memory according to the last-written occurrences of the respective identifiers.

2. The apparatus according to claim 1, wherein the memory and the controller are part of a solid-state drive.

3. The apparatus according to claim 1, wherein the controller is further configured to store in the map a respective length of the host pages associated with each of the last-written occurrences of each of the respective identifiers.

4. The apparatus according to claim 3, wherein the controller is further configured to store the respective lengths of the host pages in a table recording used space.

5. The apparatus according to claim 3, wherein the respective length of a first of the last-written occurrences differs from the respective length of a second of the last-written occurrences.

6. The apparatus according to claim 1, wherein the controller is further configured to initiate a self recovery automatically in response to a corruption of the map.

7. The apparatus according to claim 1, wherein the controller is further configured to read data from the memory suitable to decrypt one or more of the host pages stored in an encrypted condition.

8. The apparatus according to claim 1, wherein (i) the controller is further configured to initiate a self recovery in response to a signal received from a computer, and (ii) the map is rebuilt in the computer.

9. The apparatus according to claim 1, wherein the controller is further configured to initiate a self recovery automatically in response to encountering one or more discrepancies in metadata stored in the memory.

10. The apparatus according to claim 1, wherein the apparatus is implemented as one or more integrated circuits.

11. A method for self recovery in a memory controller, comprising the steps of:
    (A) reading a plurality of time stamps associated with a plurality of data units stored in a plurality of bands in a memory coupled to the memory controller, wherein (i) each of the bands comprises a plurality of blocks, (ii) each of the blocks comprises a plurality of memory pages, (iii) the memory pages are configured to store a plurality of host pages, (iv) each of the host pages comprises one or more of the data units, and (v) each of the host pages is associated with a respective identifier in a host address space, a respective location in a physical address space of the memory, and a respective epoch value;
    (B) generating a plurality of lists identifying an order in which the data units were written to the memory based on the time stamps;
    (C) performing a sequence of reads of the respective identifiers from the bands based on the lists and the respective epoch values;
    (D) locating each last-written occurrence of the respective identifiers based on the sequence of reads; and
    (E) rebuilding a map identifying where the data units are stored in the physical address space of the memory according to the last-written occurrences of the respective identifiers.

12. The method according to claim 11, wherein the memory and the memory controller are part of a solid-state drive.

13. The method according to claim 11, further comprising the step of:
    storing in the map a respective length of the host pages associated with each of the last-written occurrences of each of the respective identifiers.

14. The method according to claim 13, wherein the respective length of a first of the last-written occurrences differs from the respective length of a second of the last-written occurrences.

15. The method according to claim 11, further comprising the step of:
    initiating the self recovery automatically in response to a corruption of the map.

16. The method according to claim 11, further comprising the step of:
    reading data from the memory suitable to decrypt one or more of the host pages stored in an encrypted condition.

17. The method according to claim 11, further comprising the step of:
    initiating the self recovery in response to a signal received from a computer, wherein the map is rebuilt in the computer.

18. The method according to claim 11, further comprising the step of:
    initiating the self recovery automatically in response to encountering one or more discrepancies in metadata stored in the memory.

19. An apparatus comprising:
    an interface configured to process a plurality of read/write operations to/from a memory, wherein (i) the memory is configured to store a plurality of time stamps associated with a plurality of data units in a plurality of bands, (ii) each of the bands comprises a plurality of blocks, (iii) each of the blocks comprises a plurality of memory pages, (iv) the memory pages are configured to store a plurality of host pages, (v) each of the host pages comprises one or more of the data units, and (vi) each of the host pages is associated with a respective identifier in a host address space, a respective location in a physical address space of the memory, and a respective epoch value; and
    a controller configured to (i) read the time stamps from the memory, (ii) generate a plurality of lists identifying an order in which the data units were written to the memory based on the time stamps, (iii) perform a sequence of reads of the respective identifiers from the bands based on the lists and the respective epoch values, (iv) locate each last-written occurrence of the respective identifiers based on the sequence of reads and (v) rebuild a map identifying where the data units are stored in the physical address space of the memory according to the last-written occurrences of the respective identifiers.

20. The apparatus according to claim 19, wherein the memory and the controller are part of a solid-state drive.

* * * * *